US008488558B2

(12) United States Patent
Chu et al.

(10) Patent No.: US 8,488,558 B2
(45) Date of Patent: Jul. 16, 2013

(54) PCP/STA CAPABILITY HANDOVER IN A WIRELESS NETWORK

(75) Inventors: Liwen Chu, San Ramon, CA (US); George Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 363 days.

(21) Appl. No.: 12/775,362

(22) Filed: May 6, 2010

(65) Prior Publication Data

US 2011/0274084 A1 Nov. 10, 2011

(51) Int. Cl.
*H04W 4/00* (2009.01)
(52) U.S. Cl.
USPC ............................ 370/331; 370/338; 370/341
(58) Field of Classification Search
None
See application file for complete search history.

(56) References Cited

U.S. PATENT DOCUMENTS

| | | | |
|---|---|---|---|
| 8,189,526 B2* | 5/2012 | Hsu et al. ...................... 370/329 |
| 2007/0115899 A1 | 5/2007 | Ovadia et al. |
| 2008/0045217 A1 | 2/2008 | Kojima |
| 2008/0096562 A1* | 4/2008 | Wu et al. ....................... 455/436 |
| 2008/0123851 A1* | 5/2008 | Guccione et al. .............. 380/270 |
| 2009/0086676 A1 | 4/2009 | Meylan et al. |
| 2010/0046468 A1* | 2/2010 | Oi et al. ........................ 370/331 |
| 2011/0069650 A1* | 3/2011 | Singh et al. .................... 370/311 |
| 2011/0149842 A1* | 6/2011 | Cordeiro ....................... 370/328 |
| 2011/0158145 A1* | 6/2011 | Gong et al. .................... 370/312 |
| 2011/0199966 A1* | 8/2011 | Cordeiro et al. .............. 370/328 |

* cited by examiner

*Primary Examiner* — Chi Pham
*Assistant Examiner* — Soon-Dong D Hyun
(74) *Attorney, Agent, or Firm* — Hogan Lovells US LLP

(57) ABSTRACT

Handover of the role of a personal basic service set coordination point (PCP) in a personal wireless area network occurs with the issuance of a PCP handover request by the existing PCP station. A response from a PCP handover capable station within the BSS includes attributes of the responding station pertinent to its ability to carry out the role of a PCP. Once a new PCP station has been identified, handover steps are undertaken to modify beacon filtering and beam-forming in other non-PCP stations within the BSS to facilitate interruption free transition from the old PCP to the new PCP.

24 Claims, 2 Drawing Sheets

PCP/STA CAPABILITY HANDOVER IN A WIRELESS NETWORK

BACKGROUND OF THE INVENTION

1. Field of the Invention

Embodiments of the present invention relate, in general, to personal wireless networks and more particularly to personal basic service set coordination point handovers in a personal wireless network.

2. Relevant Background

The Institute for Electronic and Electrical Engineers (IEEE) 802.11 standard for wireless networking details specifications and procedures for infrastructure Base Service Set (BSS), Independent BSS, and Mesh BSS in bands lower than 6 GHz. Wi-Fi also details specifications and procedures for peer-to-peer networks. All these networks can cover a large scope (several hundred meters).

IEEE and several organizations continue work to define specifications and procedures for wireless communications in the 60 GHz band. License-free 60 GHz radios have unique characteristics that make them significantly different from traditional 2.4 GHz or 5 GHz license-free radios and from licensed-band millimeter-wave radios. Oxygen attenuates 60 GHz signals. This is unique to the 60 GHz spectrum and limits the distances that 60 GHz links can cover to just about 10 meters. Even in such a distance, to guarantee Medium Access Control (MAC) layer data rate at about 1 Gbps, directional communication between the source station and the destination station is required.

WiGig Alliance (WGA) was established by more than 15 technology leaders within the CE, PC, semiconductor and handheld industries to unify the next generation of wireless products by encouraging the adoption and widespread use of 60 GHz wireless technology worldwide. WGA 60 GHz specification defines a new kind of BSS, referred to as a personal basic service set (PBSS) which is Personal Area Network (PAN) per 60 GHz's radio property. A PBSS is a BSS which forms a self-contained network, includes a PBSS coordination point (PCP), and in which access to a distribution system (DS) is not available. Membership in a PBSS implies that wireless communication with all other members of the PBSS is possible without creating a direct link as in the 802.11 infrastructure BSS under 60 GHz.

An important difference between an independent BSS (IBSS) and the PBSS is that within the PBSS only a single station (STA), namely the PCP, is responsible for beacon frame transmission. Within the IBSS, all STAs are responsible for beacon frame transmission. When compared to the infrastructure BSS, the PBSS does not provide certain distribution system services.

As long as the PCP remains active and capable of managing the BSS, other stations can come and go freely. As they enter, new stations are synchronized with the other stations, and as a STA leaves, it is removed from the PCP's managerial list. However, as the PCP is simply a peer device fulfilling the role of a master controller, it, too, may depart from the network it has itself established. When a PCP leaves the network or becomes incapable of fulfilling the role as the PCP, the PBSS ceases to exist unless the role of the PCP can be handed over to another station within the BSS that is capable and willing to undertake the PCP responsibilities.

Handing over the control and management of the stations within a BSS efficiently and without disrupting the PBSS is one of many challenges that are addressed by one or more embodiments of the present invention.

SUMMARY OF THE INVENTION

A system and method for handing over PCP functionality to a capable wireless station within a BSS is hereafter described by way of example. Embodiments of the present invention disclose and describe a handover process by which an existing PCP in a PAN can efficiently and effectively hand over its role as the master and controlling device with minimal disruption to communications between the stations forming the BSS.

During the association stage, the PCP handover capable station provides attributes useful in selecting the new PCP. These attributes include a PCP intent value, indicative of the PCP handover capable station's power supply level. Another attribute is the number of stations which the new PCP can support. The PCP uses the handover attributes of PCP handover capable stations to select the PCP handover capable station with which to perform explicit handover. The PCP also uses the handover attributes to decide priority during an implicit handover.

One method embodiment for carrying out a handover in a wireless communication system includes initiating a handover request within the wireless communication system from the existing PCP to at least one PCP handover capable station within the BSS. The PCP handover capable station, upon receiving the handover request, issues a handover response either accepting or rejecting the request. The communications between the PCP and the one or more PCP capable station for the PCP handover within the BSS is conveyed via handover request/response frames apart from beacon frames, allowing for minimal disruption of the PAN.

During the handover process, after receiving a handover Response that the PCP handover capable station accepts the handover request, the current PCP informs other stations within the BSS of the pending change. This notification allows the other stations within the BSS to update MAC filters to be aligned with the new PCP. In addition, beam-forming is initiated during the transitory period to provide for a smooth and interruption free transition.

Methods to avoid interruption of data communication during implicit handover are also proposed. The invalidating period of a pseudo-static service period is selected to be longer than the initiating implicit handover time so that the stations can still use the pseudo-static service period to do data communication without interrupt after implicit handover.

A system for carrying out handovers between wireless stations in a wireless communication system is reflected in another embodiment of the present invention. Such an embodiment includes a personal wireless network associated with a PCP, forming a BSS. Within the BSS exists at least one PCP handover capable station. To execute a handover, the PCP is configured to send a request to one PCP handover capable station within the BSS to assume the role of the PCP for the BSS. The PCP handover capable station within the BSS which is in receipt of the message responds by way of a communication system, using specific request and response frames indicating whether it is willing to accept the role of the PCP. If the PCP handover capable station rejects the request, the PCP may select another PCP handover capable station to do the explicit PCP handover.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them, will become more apparent, and the invention itself will be best understood, by reference to the following description of one or more embodiments, taken in conjunction with the accompanying drawings, wherein.

The Figures depict embodiments of the present invention for purposes of illustration only. One skilled in the art will readily recognize, from the following discussion, that alternative embodiments of the structures and methods illustrated herein may be employed without departing from the principles of the invention described herein.

DESCRIPTION OF THE INVENTION

Figure 1:
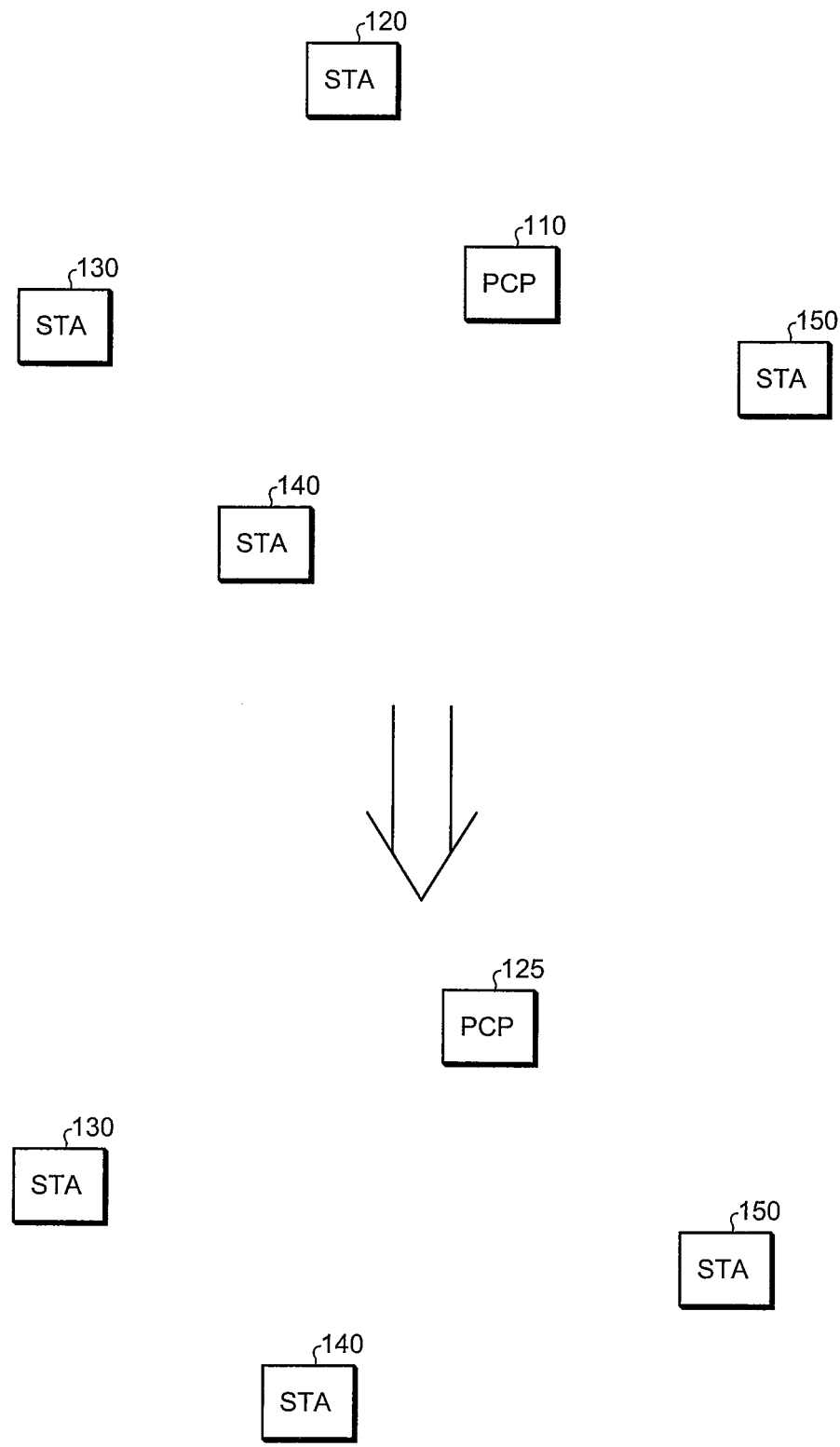
FIG. 1 shows a two phase rendition of a personal area network before and after a PCP handover.

Systems and methods for handing over responsibilities of the coordination point in a personal basic service set are hereafter described by way of example. FIG. 1 shows a two part depiction of a personal area network consistent with the embodiments of the present invention before and after a PCP handover. A plurality of stations 110, 120, 130, 140, 150 join to form a BSS with one station 110 serving as a centralized control and management device. The station 110 occupying the role of controller is deemed the Coordinating Point for the BSS, commonly referred to as the Personal Basic Service set Coordinating Point or PCP. One of reasonable skill in the relevant art will recognize that many stations within any particular BSS may occupy the coordination and access point role.

Non-structured networks of this type are constantly in flux. Accordingly, the station acting as the PCP 110 may, from time-to-time, no longer be able or willing to fulfill that role. In that situation, the responsibilities of the PCP function must be handed over to another capable station 125 within the BSS. In the depiction in the lower half of FIG. 1, station 120 becomes the new PCP 125 as a result of the departure of the former PCP 110. Traditionally, information regarding a station's ability to occupy the role of PCP is passed from the non-PCP stations to the PCP station via Association Request/Information Request frames. This information includes antenna type, reverse direction information, high layer timer synchronization, and TPC. In networks functioning on a mmWave basis, PCP capability information can include TDDTT, pseudo-static allocations, PCP handover and SFS interference mitigation.

The PCP handover capable bit does not provide enough information for the current PCP to select a candidate PCP to conduct a PCP handover. More information is required. According to one embodiment of the present invention, a PCP handover capable station uses a PCP intent value and a station association number to show the intention to be the PCP and the capability after being the PCP. The PCP intent value is a numerical assessment showing a relative PCP capability of the responding station. Normally a station with battery power supply has lower intention value than a station with line power supply. A station having a high power supply and capable antennae array would justify a higher PCP intent value, while a station with low relative power and a single limited antenna may warrant a lower value.

Similarly, the ability to support more stations within a BSS would increase that station's likelihood of occupying the role of the PCP. Indeed, if a responding station indicated that it could not manage the stations that were currently present in the BSS, the selection of that particular station as the next PCP could jeopardize the functionality of the BSS.

Another aspect used in selecting the new PCP is whether the PCP handover capable station also possesses the ability to be an access point. As one of reasonable skill in the relevant art will recognize, not all PCPs are access points. However, in situations in which the current PCP is fulfilling the role as an access point, the station to which the PCP role will be handed should also be Access Point (AP)-capable.

The following description with reference to the accompanying drawings is provided to assist in a comprehensive understanding of exemplary embodiments of the present invention, as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

By the term "substantially", it is meant that the recited characteristic, parameter, or value need not be achieved exactly, but that deviations or variations, including, for example, tolerances, measurement error, measurement accuracy limitations, and other factors known to those of skill in the art, may occur in amounts that do not preclude the effect the characteristic was intended to provide.

A PCP handover may occur for a variety of reasons. For example, the current PCP may move out of the current BSS or, as more stations are added to the BSS, the current PCP may be incapable of efficiently managing the increasing number of stations. Regardless of the reason why the handover occurs, it is crucially important to the continued functionality of the BSS that the handover take place efficiently and quickly.

A handover can be either explicit or implicit. In an explicit handover, the current PCP, recognizing that a handover is necessary, initiates and executes the handover deliberately. An implicit handover occurs when the current PCP partially fails in its coordination role within the BSS. In many instances, the PCP is unaware of this failure, or is incapable of initiating an explicit handover. While in an explicit handover, the existing PCP selects the new PCP based on various attributes of other non-PCP stations, in an implicit handover, the other stations elect a new PCP without interaction with the current PCP.

Explicit PCP Handover

Figure 2:
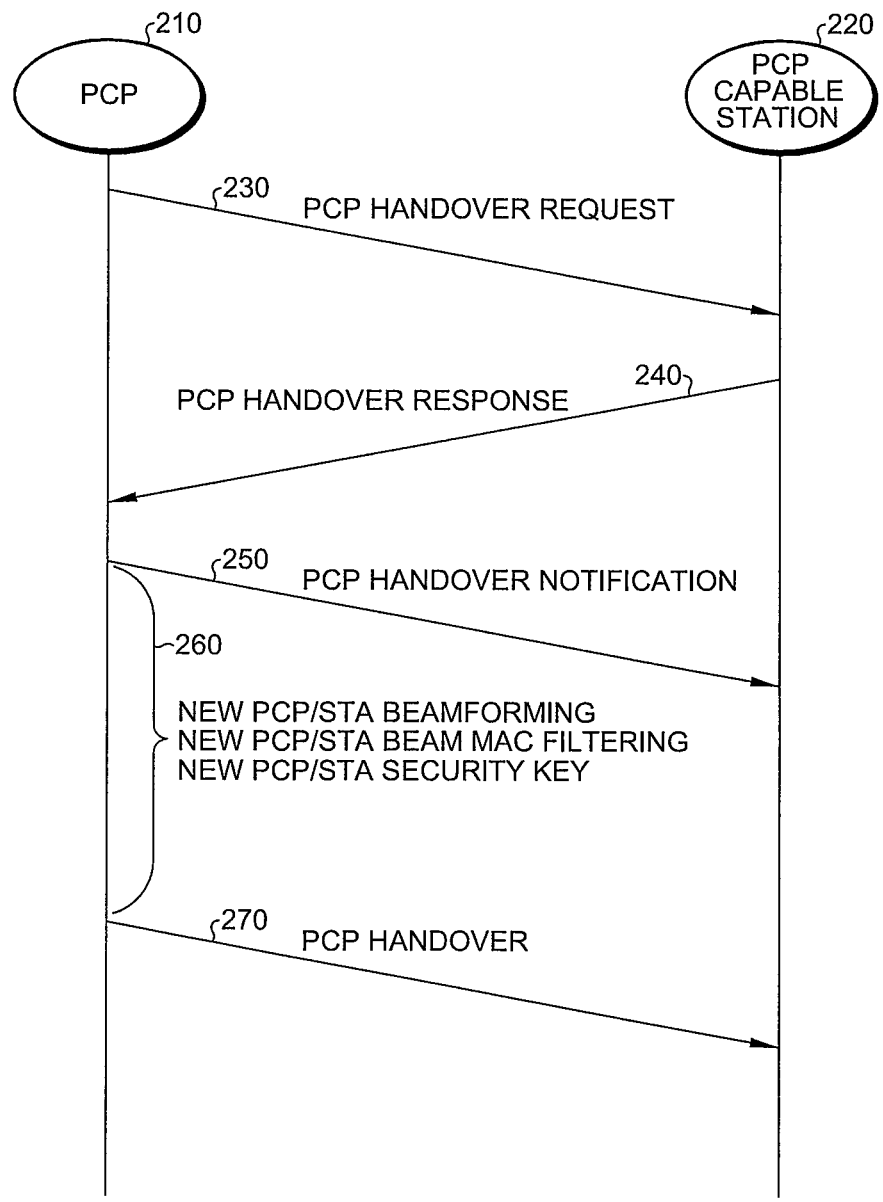
FIG. 2 shows a flowchart of communications between a PCP and PCP handover capable station during a PCP handover, according to one embodiment of the present invention.

An explicit PCP handover occurs when the current PCP, for one or more of a variety of reasons, determines that it must hand off its role as the coordinator of the BSS. These reasons can include leaving the personal BSS, a low power condition, and/or the recognition that other stations within the BSS are more capable of fulfilling the PCP role. FIG. 2 shows a process flowchart of communications between a PCP and a PCP handover capable station, according to one embodiment of the present invention, during the execution of an explicit handover. As shown in FIG. 2, and according to one embodiment of the present invention, the current PCP 210 issues a request 230 by way of a request frame to a PCP handover capable station 220 within the BSS, seeking a replacement for the PCP role. The current PCP can issue the request to one select station within the BSS. During explicit handover, the PCP sends a handover request to one PCP handover capable station. If the explicit handover fails, the PCP can start the explicit handover with another PCP handover capable station.

Once the handover request has been issued, the station within the BSS receiving the request responds with a handover response 240 by either accepting or rejecting the proposal. If the PCP handover capable station rejects the PCP explicit handover request, the PCP may request another PCP handover capable station to act as the PCP.

A non-PCP station can also reject the request to become the new PCP based on an inability to meet the PCP demands. For example, a PCP handover request issued from an AP-capable PCP would be rejected by a non-PCP station that is not AP-capable. In addition, a non-PCP station may reject the PCP handover request when it is a low power candidate or has other unspecified reasons why it could not adequately fulfill the role as the BSS's PCP.

A rejection can also be issued by the non-PCP if the current PCP is remaining within the BSS. However, when the current PCP communicates that the reason for the handover request is its impending departure from the BSS, then the non-PCP cannot reject the request outright.

Another aspect of the present invention relates to beam-forming and security 260 during the handover process. As one of reasonable skill in the art will understand, communications between the PCP and other stations within the BSS are optimized by beam-forming. Each station identifies the sector in which the PCP exists and conducts a beam-forming optimization process to optimize communication with the PCP.

The receipt of a response of accepting the handover request also initiates a count down, or timer, during which the beam-forming with the new PCP should be done and security session key with the new PCP should be negotiated. The count down is, according to one embodiment of the present invention, selected based on the number of associated stations within the BSS. The count down, which is normally measured by the passing of beacon intervals, should be no shorter than a minimum period of time needed for each station to do beam-forming and negotiate security session key with the new PCP.

According to one embodiment of the present invention, beam-forming between the new PCP and the remaining stations within the BSS occurs prior to the handover, but after the new PCP has been selected. Once the new PCP has been selected by the existing PCP, the current PCP uses a beacon 250 to notify its associated stations in the BSS of the ongoing handover. The beacon message includes the new PCP's identification number (new PCP's MAC address) and a specified period of time based on beacon intervals. As the timer counts down, based on passing TBTTs, the stations can beam-form with the new PCP. The current PCP can give high priority to the time used for such beam-forming training.

When the handover countdown reaches zero and the PCP handover occurs 270, the stations associated with the current PCP shift to now use the new PCP's MAC address as the beacon filtering address. In such a manner, the transition from the current to the new PCP is seamless, resulting in little or no loss of functionality in the BSS. In addition to beam-forming and modification of the beacon filter, the stations within the BSS can also create new security keys for interaction with the new PCP during this transitional period.

Implicit PCP Handover

PCP handover can also occur implicitly. A station currently operating as a PCP can, for one or more reasons, cease to operate as the PCP. In many cases, the PCP's inability to function as a PCP is not distinct, but gradual, and can be imperceptible to the PCP. When such a deficiency is recognized by other stations within the BSS, since no beacon/announcement frames are not received from the PCP, an implicit handover occurs.

Recall that the service period is a time slot during which the current PCP communicates with other non-PCP stations. During this period, data frames are transmitted between stations. One such service period is a pseudo-static service period; the period is substantially static, albeit offset, over one or more beacon intervals.

Each beacon or announcement frame will include the schedule information to show the time allocation in each beacon interval. A station may not be able to receive such frames because of some situation such as interference. A period of time exists during which no schedule information about the pseudo-static service period is received, but the offset will not change. This period is called the invalidating period of a pseudo-static service period. This means that, despite a failure of receiving pseudo-static service period schedule information for a certain period of time, the offset will remain unchanged so that a station can use this time slot to communicate with its peer station.

However, if after the expiration of the interval no beacon/announce frames are received from the PCP, the non-PCP assumes the current PCP is not functioning and thereafter starts the implicit handover. This period is called the initiating implicit handover time. If the initiating implicit handover time and the invalidating period of a pseudo-static service period are the same, each time the implicit handover occurs, the allocated pseudo-static service period can not be used and the data communication must be stopped for some time.

According to one embodiment of the present invention, the trigger to invalidate a pseudo-static service period is extended, making the invalidating period of a pseudo-static service period longer than the initiating implicit handover time. By extending the invalidating period of a pseudo-static service period, after implicit handover procedures are finished and the new PCP sends beacon/announcement frames, the pseudo-static service period can still be used without loss of data transmissions.

After an explicit handover or implicit handover has occurred, the BSS environment may change. As the location of the PCP has changed due to the handover, and the capabilities of the new PCP may not perfectly match with those of the past PCP, the BSS environment of the new PCP may differ from that of the previous PCP. After a handover, all non-PCPs register with the new PCP in the newly formed BSS. This registration occurs during a defined time period such as the maximum lost beacon time period. New stations are recognized, and if the PCP cannot receive frames for registration from a station during the maximum lost beacon frame period, that station is removed from the BSS. Finally, the initiation of a new BSS starts an active time limit which requires the new PCP to remain the PCP for a predetermined period of time before initiating another PCP handover request, so as to promote BSS stability.

Included in the description are communication flowcharts and/or timelines depicting examples of the methodology, which may be used to handover PCP operations in a personal wireless network. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer, or other programmable apparatus, create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture, including instruction means, that implement the function specified in the flowchart block or blocks. The computer program instructions may also be loaded onto a computer or other programmable apparatus to cause a series of operational steps to be performed in the computer, or on the other programmable apparatus, to produce a computer-implemented process, such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

A registration from a PCP handover capable station within the BSS includes attributes of the responding station pertinent to its ability to carry out the role of a PCP. Such information is used by the current PCP to select a candidate PCP during both explicit handover and implicit handover. A methodology and system for efficient and reliable PCP handover in a personal wireless area network includes the issuance and response to a PCP handover request. Furthermore, during the handover, steps are undertaken to modify beacon filtering in other non-PCP stations within the BSS to facilitate interruption free transition from the old PCP to the new PCP. These steps include beam-forming between the new PCP and each non-PCP station in the BSS before the candidate PCP acts as PCP through sending beacon/announcement frames. When a new PCP is chosen, notifications are issued to the other stations within the BSS so that beacon filtering adjustments can be accomplished.

Just as PCP handover can occur explicitly, so, too, can it occur implicitly. When a PCP demonstrates its inability to carry out its PCP role, a contention occurs between other PCP handover capable stations within the BSS to determine which station will undertake the role of PCP. The invalidating period of a pseudo-static service period is selected to be longer than the initiating implicit handover time so that the stations can still use the pseudo-static service period for data communication without interrupt after implicit handover. After an explicit handover or implicit handover has occurred, if a non-PCP station does not register with the new PCP within the predefined timeframe, the new PCP will remove the non-PCP station from the BSS.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with a PCP handover, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known, per se, and which may be used instead of, or in addition to, features already described herein. Although claims have been formulated in this application to particular combinations of features, it should be understood that the scope of the disclosure herein also includes any novel feature or any novel combination of features disclosed, either explicitly or implicitly, or any generalization or modification thereof which would be apparent to persons skilled in the relevant art, whether or not such relates to the same invention as presently claimed in any claim, and whether or not it mitigates any or all of the same technical problems as confronted by the present invention. The Applicant hereby reserves the right to formulate new claims to such features and/or combinations of such features during the prosecution of the present application, or of any further application derived therefrom.

The invention claimed is:

1. A method for switching which station serves as a personal basic service set coordination point (PCP) within a basic service set (BSS) comprising a plurality of stations capable of communicating wirelessly, of which only one station acts as the PCP at a time, the method comprising:

initiating, by a station serving as the PCP, a switch of the station serving as the PCP by an explicit handover comprising negotiations between the station serving as the PCP and at least one PCP capable station in the BSS; and responsive to detecting a departure of the station serving as the PCP from the BSS without the explicit handover, initiating an implicit handover of PCP responsibilities to at least one PCP capable station;

wherein the negotiations for explicit handover comprise sending a handover request from the station serving as the PCP to the at least one PCP capable station and receiving at the station serving as the PCP a handover response from the at least one PCP capable station, wherein the handover response accepts or rejects the handover request.

2. The method according to claim 1 wherein registration information transmitted by a PCP capable station upon joining the BSS includes attributes representative of the PCP capable station's ability to serve as a PCP.

3. The method according to claim 2 wherein the registration information includes a PCP intention number indicative of the PCP capable station's intention to be the PCP.

4. The method according to claim 2 wherein the registration information includes an associated station number representative of a number of stations that the PCP capable station can support.

5. The method according to claim 2 wherein the registration information includes the PCP capable station's ability to act as an access point.

6. The method according to claim 1 wherein an invalidating period of a pseudo-static service period is longer than a period of missing beacons required to initiate the implicit handover.

7. The method according to claim 1 wherein upon completion of a switch each station within the BSS registers with the station which has become the station serving as the PCP.

8. The method according to claim 7 wherein the station which has become the station serving as the PCP removes stations from the BSS that fail to register within a predefined period of time from completion of the switch.

9. The method according to claim 1 wherein
the handover request and handover response are communicated via handover request/response frames apart from beacon frames.

10. The method according to claim 9 wherein responsive to receiving a positive handover response from the at least one PCP capable station, further comprising initiating beamforming between stations associated with the PCP and the at least one PCP capable station prior to handover.

11. The method according to claim 9 responsive to receiving a positive handover response from the at least one PCP capable station, further comprising notifying stations associated with the station currently serving as the PCP of the switch from the station currently serving as the PCP to the at least one PCP capable station.

12. A wireless communication system; comprising:
a plurality of stations forming a basic service set (BSS), in which one of the plurality of stations serves as a personal basic service set coordination point (PCP) at a time; and
wherein a switch of which station within the BSS serves as the PCP can occur by negotiations for an explicit handover initiated by a station serving as the PCP with at least one PCP capable station in the BSS, or responsive to detecting a departure of the station serving as the PCP from the BSS without the explicit handover, by an implicit handover of PCP responsibilities to a PCP capable station and
wherein the negotiations for an explicit handover comprise sending a handover request from the station serving as the PCP to the at least one PCP capable station, and receiving at the station serving as the PCP a handover response from the at least one PCP capable station, wherein the handover response accepts or rejects the handover request.

13. The system according to claim 12 wherein registration information transmitted by a PCP capable station upon joining the BSS includes attributes representative of the PCP capable station's ability to serve as a PCP.

14. The system according to claim 12 wherein an invalidating period of a pseudo-static service period is longer than a missing beacon period of missing beacons required to initiate the implicit PCP handover.

15. The system according to claim 12 wherein upon completion of a switch each station within the BSS registers with the station which has become the station serving as the PCP.

16. The system according to claim 15 wherein the station which has become the station serving as the PCP removes stations from the BSS that fail to register within a predefined period of time from completion of the switch.

17. The system according to claim 12 wherein the handover request is conveyed to the at least one PCP capable station via a request frame.

18. The system according to claim 12 wherein responsive to receiving acceptance of the handover request from the at least one PCP capable station, the at least one PCP capable station accepting the handover request is configured to beamform with stations in the BSS.

19. The system according to claim 12 wherein responsive to receiving acceptance of the handover request from the at least one PCP capable station, the PCP is configured to notify stations within the BSS that the at least one PCP capable station will be the new PCP.

20. A computer system for a station within a basic service set (BSS) of a wireless communication system, wherein the station is capable of serving as a personal basic service set coordination point (PCP) for the wireless communication system, the computer system comprising:
at least one machine capable of executing instructions embodied as software; and
a plurality of software portions, wherein
a first of said software portions is configured to switch which station serves as the PCP by an explicit handover comprising negotiations between a station serving as the PCP and at least one PCP capable station in the BSS, and
a second of said software portions is configured to detect a departure of the station serving as the PCP from the BSS and responsive to detection of the departure of the station serving as the PCP without completion of the explicit handover, the second software portion is configured to switch which station serves as the PCP by an implicit handover of PCP responsibilities to at least one PCP capable station.

21. The computer system according to claim 20 wherein one of said software portions is configured so that during an association process, a station associating with the BSS is configured to send Association Request/Information Request data including attributes of that station's ability to serve as a PCP.

22. The computer system according to claim 20 wherein one of said software portions is configured to determine a PCP intention number indicative of the at least one PCP capable station's power supply and a number of stations that the at least one PCP capable station can support.

23. The computer system according to claim 22 wherein one of said software portions is configured to analyze attributes of responding PCP capable stations to determine a new PCP.

24. The computer system according to claim 23 wherein one of said software portions is configured to send a beacon message to each station within the BSS informing them of the new PCP.

* * * * *

UNITED STATES PATENT AND TRADEMARK OFFICE
CERTIFICATE OF CORRECTION

| | | |
|---|---|---|
| PATENT NO. | : 8,488,558 B2 | Page 1 of 1 |
| APPLICATION NO. | : 12/775362 | |
| DATED | : July 16, 2013 | |
| INVENTOR(S) | : Liwen Chu and George Vlantis | |

It is certified that error appears in the above-identified patent and that said Letters Patent is hereby corrected as shown below:

In the Claims:

Column 9, line 60, after station add --;--

Signed and Sealed this
Twenty-sixth Day of November, 2013

Margaret A. Focarino
*Commissioner for Patents of the United States Patent and Trademark Office*